Patented Jan. 10, 1939

2,143,482

UNITED STATES PATENT OFFICE 2,143,482

NONFOGGING LAMINATED GLASS

Willy O. Herrmann, Deisenhofen and Alfons von Putzer-Reybegg, Burghausen, Germany, assignors to Chemische Forschungsgesellschaft m. b. H., Munich, Germany, a corporation of Germany No Drawing. Application May 13, 1936, Serial No. 79,617. In Germany February 21, 1934

5 Claims. (Cl. 49—92)

This invention relates to the preparation of transparent, non-fogging windshields, windows and the like.

Most windshields, windows of buildings or vehicles, show windows, gas mask glasses and the like are subject to clouding due to moisture condensation, especially at low outside temperatures, from the moisture content of the inner air. Such clouding or fogging makes windshields and windows non-transparent. Previous attempts to overcome this clouding tendency especially in the case of gas masks employed the use of Celluloid or gelatin sheets inserted on the inside of the windows. Other methods of protecting against fogging include the use of ventilators or fans which direct a stream of air across the area that tends to fog. Because of the troublesome nature of these and other protective expedients, one generally puts up with the nuisance of fogging of windows, especialy in automobiles or railway conveyances.

This invention has as an object a windshield or window material which will not fog under the usual fogging conditions. A further object is a window material which is non-fogging and also affords protection against shattering and splintering. Other objects will be apparent from the following description of the invention.

These objects are accomplished in accordance with the present invention by employing polyvinyl alcohol as the window material or as a coating substance for a window material. Windows so made or so treated have been found to be non-fogging even at low temperatures and to have the additional advantage that they are non-shattering and afford excellent protection against splintering.

It has been found that polyvinyl alcohol films possess superior mechanical properties over Celluloid or gelatin discs especially in regards resistance to tearing, elasticity and flexibility. Furthermore, the durability of such films is incomparably greater than that of other materials previously used for such purposes. Futhermore, the above superior mechanical properties and durability afford better protection against scratching or otherwise ruining of such protective surfaces. These properties of polyvinyl alcohol make possible the use of this substance in preparing non-fogging window materials which do not require frequent replacement as would such materials when prepared from gelatin or Celluloid.

In this specification and in the appended claims, the term "window material" is intended to mean any material that may be used for windshields, windows for buildings or conveyances such as automobiles and railway coaches as well as to the windows present in gas masks and similar devices.

Window materials which, besides being non-fogging are non-shattering, may be prepared in accordance with the present invention by making such materials entirely or in part of polyvinyl alcohol. They may be made by combining two or more layers of such material by joining them with the aid of adhesive materials or by means of heat and pressure. The applicability of such window materials consisting essentially of polyvinyl alcohols may be increased or made more suitable for special purposes in various manners. The flexibility, hardness and clarity of such materials may be varied by selecting various polymerization forms of polyvinyl alcohol or by suitable additions of softening agents or electrolytes such as the alkali sulfocyanides. In addition, such window materials may be modified by heating in a stream of gas or by reacting them with aldehyde vapors or tanning agents. The purpose for which the material is intended will determine what type of treatment or addition agent should be used.

Layers or films of polyvinyl alcohol may also be combined in accordance with the present invention with layers of other plastic materials to give excellent window materials. Of the many plastic materials that may be used successfully in this connection are the esters, acetals and ethers of polyvinyl alcohols, polymers of acrylic acid, methacrylic acid and itaconic acid and their esters, polystyrols, butadiene polymers and similar rubber-like products, cellulose derivatives, aldehyde and urea or phenol condensation products and condensation products of polybasic acids and alcohols.

Combinations of layers of polyvinyl alcohol with layers of other plastic materials may be accomplished by bringing a solution of one material upon another material and pressing together the different layers after evaporation of the solvent. This may be conveniently accomplished at elevated temperatures. Another method of accomplishing such a combination is to adhesively join the layers in question. Any of the commonly employed adhesives for such plastic materials may be used. The polyvinyl esters, polyacrylic acid esters and various cellulose derivatives have been found to be particularly well adapted as adhesive materials for this purpose.

Polyvinyl alcohol films also may be combined with or without the aid of intermediate layers of the above kind with a sheet of glass. Such a combination produces a transparent, non-fogging glass as well as a shatter-proof glass. This method makes possible an unusually cheap safety glass in that it may be prepared from common window glass or from so-called hard glass that has been ground to give a fine grain.

Polyvinyl alcohol films may also be combined in accordance with the present invention, with or without intermediate layers of other plastic or adhesive materials, with the product hitherto known as safety glass, consisting of sheets of glass joined together by a plastic material. As in the above cases, such a product remains transparent in that fogging due to condensation of moisture will not occur. The application of at least one film of polyvinyl alcohol affords protection against splintering and shattering of such a product. The resistance to breaking and to thrown projectiles is likewise increased, especially when a plurality of layers of polyvinyl alcohol has been applied to one or more surfaces of such glass.

In preparing window materials employing polyvinyl alcohol alone, layers of polyvinyl alcohol with other plastic materials or layers of polyvinyl alcohol with a single sheet or laminated glass product, it is obvious that any number of layers of polyvinyl alcohol or the other materials mentioned may be employed. In addition, polyvinyl alcohol films may be applied to one or more surfaces of the material in question. Other modifications of the present invention will be readily apparent to those skilled in the preparation of window materials and similar manufactures. Polyvinyl alcohol also may be applied advantageously to non-transparent objects for the purpose of preventing moisture condensation. It is understood that these and other applications are within the scope and spirit of the present invention.

We claim:

1. A non-fogging window comprising a glass sheet having adhesively united to at least one of its exposed exterior surfaces a layer comprising polyvinyl alcohol.

2. A non-fogging window comprising a glass sheet having adhesively united to at least one of its exposed exterior surfaces a layer comprising polyvinyl alcohol and a plasticizer therefor.

3. A non-fogging window comprising a glass sheet having adhesively united to at least one of its exposed exterior surfaces a layer comprising poylvinyl alcohol and an alkali metal sulfocyanide.

4. A non-fogging window comprising a glass sheet having adhesively united to at least one of its exposed exterior surfaces a layer comprising polyvinyl alcohol insolubilized by the action of a tanning agent.

5. A non-fogging window comprising a glass sheet having adhesively united to at least one of its exposed exterior surfaces a layer comprising polyvinyl alcohol insolubilized by the action of aldehyde vapors.

WILLY O. HERRMANN.
ALFONS v. PUTZER-REYBEGG.